H. VILLIERS-STUART.
SHOCK ABSORBING COUPLING.
APPLICATION FILED AUG. 10, 1908.
925,250.
Patented June 15, 1909.
2 SHEETS—SHEET 1.
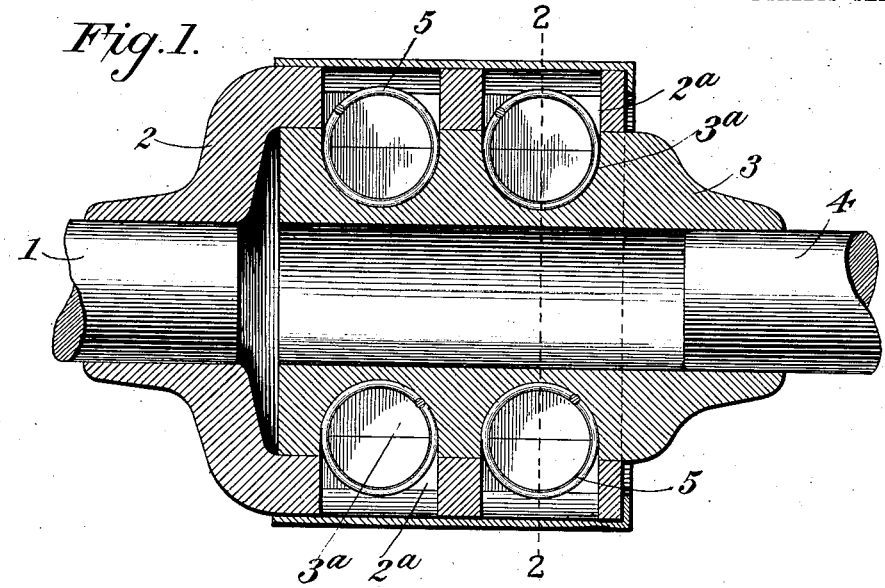
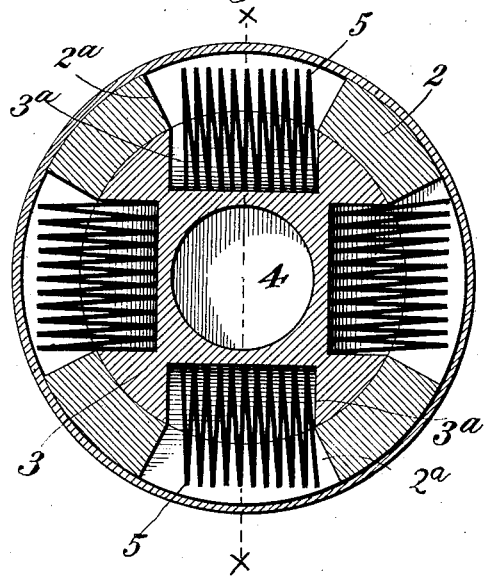 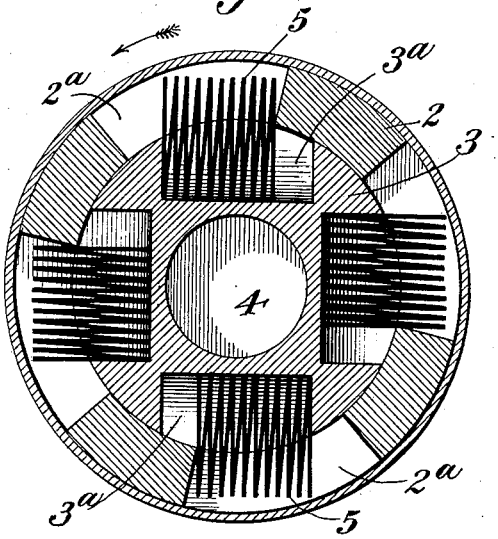
Witnesses
Inventor
Horace Villiers-Stuart
By Alexander Fowell
Attorneys H. VILLIERS-STUART.
SHOCK ABSORBING COUPLING.
APPLICATION FILED AUG. 10, 1908.
925,250.
Patented June 15, 1909.
2 SHEETS—SHEET 2.
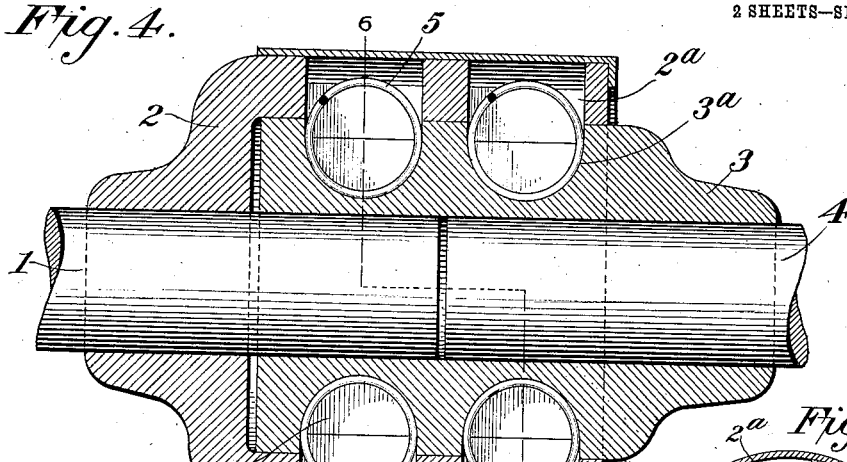
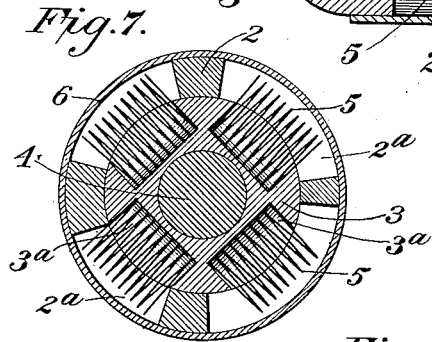
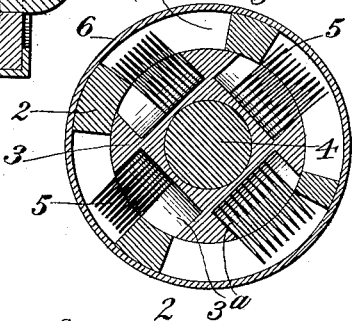
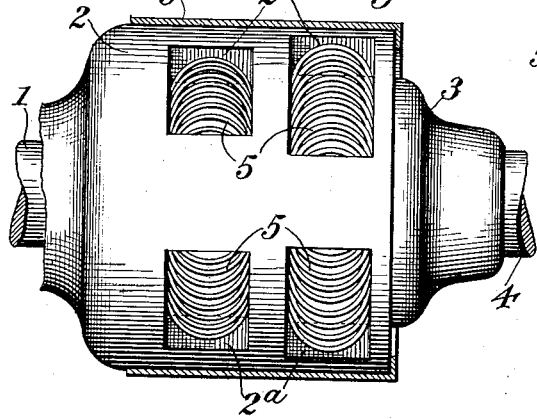
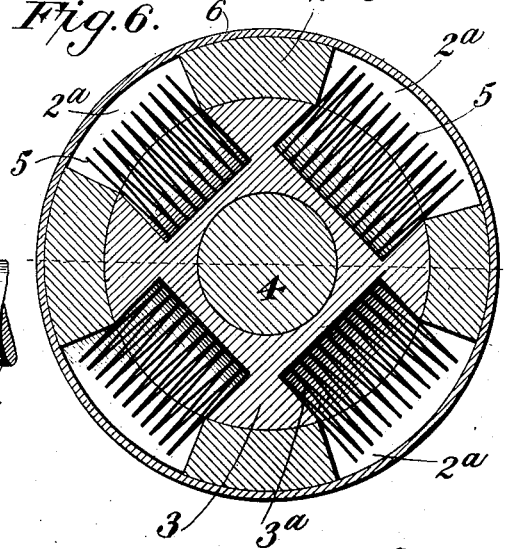

UNITED STATES PATENT OFFICE.

HORACE VILLIERS-STUART, OF LOUISVILLE, KENTUCKY.

SHOCK-ABSORBING COUPLING.

No. 925,250.　　　　Specification of Letters Patent.　　　Patented June 15, 1909.

Application filed August 10, 1908. Serial No. 447,766.

*To all whom it may concern:*

Be it known that I, HORACE VILLIERS-STUART, of Louisville,, in the county of Jefferson and State of Kentucky, have invented certain new and useful Improvements in Shock-Absorbing Couplings; and I hereby declare that the following is a full, clear, and exact description thereof, reference being had to the accompanying drawings, which form part of this specification.

This invention is a novel cushioned coupling for use as a connection between a driving and a driven member, and its object is to cushion the shock of sudden transmissions of motion, or arrest of motion from one part to another, thereby reducing the wear and tear on both parts.

The invention is particularly adapted for use on automobiles between the engine shaft or main driving shaft and a driven shaft or axle and when so employed almost all of the jerks or irregular motions of the driving shaft or engine will be absorbed by the coupling before reaching the driven shaft or wheels and the shocks on the driven shaft or wheels incident to road service are cushioned or absorbed before reaching the driving shaft or engine and thus by means of the novel coupling the durability and safety of the machine is increased and the comfort of the occupants of the vehicle is enhanced.

The invention is of course applicable to other machinery as will be readily understood by mechanicians, and I will now describe the invention as illustrated in the accompanying drawings which illustrate some practical embodiments thereof, and which will enable any one skilled in the art to readily utilize the invention.

In said drawings—Figure 1, is a longitudinal central section through the cushioned coupling on line $x$—$x$ in Fig. 2. Fig. 2, is a transverse section on line 2—2 in Fig. 1, with the cushioning springs relaxed and parts in idle position. Fig. 3, is a similar view showing the coupling in operation and the cushioning springs under partial compression. Fig. 4, is a longitudinal sectional view similar to Fig. 1, showing a slight modification of the coupling. Fig. 5, is a side view of Fig. 4, with the outer casing removed or broken away, and, Fig. 6, is a transverse section on line 6—6 of Fig. 4, Figs. 7 and 8 are transverse sectional views of another modification.

The driving shaft 1, may be the shaft of an engine or motor (not shown) or may directly or indirectly receive motion therefrom. This shaft is provided with a hollow cylindric head 2, which may either be integral with the shaft or formed separate therefrom and rigidly secured thereto in any suitable manner. The head 2, has a bore preferably of larger diameter than the shaft.

The driven shaft 4 lies in axial alinement with shaft 1, and has on its end adjacent shaft 1, a cylindric head 3, corresponding in external diameter to the internal diameter of head 2, and telescoped into head 2, as shown. The head 3, may be formed integral with shaft 4, or separately, and rigidly secured to said shaft. It will be seen that by reason of the fit between the heads the ends of the shaft will be held in axial alinement thereby. As shown in Fig. 4, the shaft 1, may be extended into the head 3, and loosely fitted therein. This in a measure will additionally prevent lateral relative play of the head.

The heads 2 and 3 are provided at coincident radial points with circumferential series of slots, $2^a$ and $3^a$, which when the parts are at rest are in exact register. The coincident slots $2^a$, $3^a$, form pockets within which are placed cushioning devices of any suitable construction,—resilient coil springs 5, being shown in the drawing, and the pockets are of such depth that the axes of the cushioning devices are about in the same plane as the outer periphery of the head 3.

It will be observed by reference to Figs. 2 and 3, that if the power is applied to rotate shaft 1, it will tend to rotate head 2 on head 3, and the cushioning devices 5 will be compressed, more or less, according to the resistance to the rotation of shaft 4. As this resistance varies, I think it desirable to graduate the resistance offered the cushioning devices and this may be done in various equivalent ways; for example, as illustrated in Figs. 2 and 3, the cushioning devices or springs 5, may be of different lengths, consequently when the driving shaft 1, turns, the cushioning devices will be compressed successively, the longer being compressed first, until shaft 4 is forced to turn. Or again, as illustrated in Figs. 5 and 6, the series of pockets formed by the registering slots $2^a$ and $3^a$ may be made of different lengths, while the cushioning devices therein are of equal lengths but in this arrangement the same result is produced—to wit: When power is applied to rotate shaft 1, the cushioning devices will be successively compressed until shaft 4 turns. Or, again, the pockets formed by the registering slots 2ª and 3ª may be of equal length and the cushioning devices be made of equal length but of varying resistance, in which case the same result will be produced when power is applied to shaft 1, the essential feature being that more and more resistance will be offered by the cushioning devices until shaft 4 turns.

While I consider the aforesaid successive action of the cushioning devices as an important feature of the invention, and it renders the coupling very sensitive and delicate in operation, I do not wish to be wholly restricted to such an assemblage of cushioning devices.

While I have indicated springs as the cushioning devices in the drawings, it is obvious that any suitable resilient or compressible cushions could be placed in the pockets as equivalents of the springs.

In the modification shown in Figs. 7 and 8, the slots in one head, as 3, may be made of equal length, as indicated; while the slots in the other head, as 2, are made of unequal length, so that the slots in the heads do not exactly register. The cushioning devices or springs 5 placed in the pockets formed by the slots in head 2 and 3 may be either of equal or unequal length, or strength. In this construction owing to the difference in the lengths of the slots the springs will come successively into operation on relative rotative movement of the heads, with the same effect as above described. In order to keep the cushioning devices in place within the slots and prevent their dropping radially therefrom, a cover or casing 6 may be placed over the heads as indicated in the drawings, and secured in any suitable manner. Of course the form of the casing may be changed to suit the design of the coupling and impart a neat and ornamental appearance thereto. It will also be obvious that upon a total compression of the cushioning devices, they will act as a lock between the heads 2 and 3, and cause shaft 4 to turn with shaft 1, or the latter stop. It will also be observed that as the pockets in which the cushioning devices are placed are preferably formed partially in both heads 2 and 3, the cushioning devices in the pockets project into both heads and will serve as a means to prevent relative longitudinal displacement or movement of the heads.

In the drawings I have shown two annular series of cushion receiving pockets in the coupling and four pockets in series arranged ninety degrees apart. Obviously the number of pockets in a series, and the number of series of pockets, could be varied according to the power to be transmitted from the driving to the driven shaft or member, and I can obtain an elasticity sufficient for all practical strains upon the engine. In this coupling the cushioning devices are brought very close to the shaft, and the coupling can be made of relatively small diameter, compared with the shaft, and also very cheaply, and the coupling serves to keep the shafts in axial alinement and also serves to prevent longitudinal relative movements thereof.

Having thus described my invention, I claim:

1. In a coupling the combination of a pair of heads provided with series of slots and cushioning devices in said slots, said slots and cushioning devices being relatively so proportioned that the cushioning devices come successively into action in transmitting motion from one head to the other.

2. A cushioning coupling for a driving and a driven member, comprising a pair of heads provided with slots and cushioning devices in said slots adapted to yieldingly transmit motion from one head to the other, said cushioning devices being adapted to successively come into action, substantially as described.

3. The combination in a coupling of an internal and external head, each provided with a series of radial slots, the slots in said heads registering and cushioning devices in said slots, said slots and cushioning devices being relatively so proportioned that the cushioning devices come successively into action in transmitting motion from one head to the other.

4. In a shock absorber, the combination of a driven shaft, a head thereon provided with an annular series of slots, a driven member a head thereon having a similar series of slots registering with those of the first head, and cushioning devices in said slots adapted to transmit motion from one head to the other—said slots and cushioning devices being relatively so proportioned that the cushioning devices are brought successively into operation upon relative rotatory movements of the heads.

5. In a shock absorbing coupling for shafts, the combination of a driven member, a driving member, cylindric heads on said members, telescoping one in the other, and provided with a plurality of annular series of radially disposed normally registering slots with resilient cushioning devices in said slots adapted to transmit motion from one head to the other upon relative rotatory movement of the head—said cushioning devices being adapted to come successively into operation.

6. In a shock absorber, the combination of a driven shaft, a tubular head thereon provided with a series of annular slots, a driven member, a cylindric head thereon telescoping with the first head and having radial slots registering with those of the first head, and cushioning devices in said slots adapted to transmit motion from one head to the other said slots and cushioning devices being relatively so proportioned that the cushioning devices are brought successively into operation upon relative rotatory movements of the head.

In testimony that I claim the foregoing as my own, I affix my signature in presence of two witnesses.

HORACE VILLIERS-STUART.

Witnesses:
H. R. GRANT,
A. J. EGELHOFF.